United States Patent
Alperovich et al.

(10) Patent No.: US 11,044,291 B2
(45) Date of Patent: Jun. 22, 2021

(54) ENHANCED ANCHOR PROTOCOL FOR EVENT STREAM PROCESSING

(71) Applicant: Microsoft Technology Licensing, LLC, Redmond, WA (US)

(72) Inventors: Alexander Alperovich, Redmond, WA (US); Boris Shulman, Sammamish, WA (US); Zhong Chen, Medina, WA (US); Lev Novik, Bellevue, WA (US); Kanstantsyn Zoryn, Redmond, WA (US)

(73) Assignee: Microsft Technology Licensing, LLC, Redmond, WA (US)

( * ) Notice: Subject to any disclaimer, the term of this patent is extended or adjusted under 35 U.S.C. 154(b) by 122 days.

(21) Appl. No.: 16/145,456

(22) Filed: Sep. 28, 2018

(65) Prior Publication Data
US 2020/0106816 A1 Apr. 2, 2020

(51) Int. Cl.
*G06F 15/16* (2006.01)
*H04L 29/06* (2006.01)
(Continued)

(52) U.S. Cl.
CPC ............ *H04L 65/60* (2013.01); *G06F 9/4401* (2013.01); *G06F 16/24568* (2019.01); *H04L 65/4069* (2013.01); *H04L 65/80* (2013.01)

(58) Field of Classification Search
CPC ..... H04L 65/60; H04L 65/4069; H04L 65/80; H04L 67/2833; H04L 67/325; G06F 16/24568; G06F 9/4401
(Continued)

(56) References Cited

U.S. PATENT DOCUMENTS

| 2009/0144784 A1* | 6/2009 | Li ..................... H04N 21/8456 725/97 |
| 2012/0047282 A1* | 2/2012 | Mehta .............. H04N 21/23424 709/231 |

(Continued)

OTHER PUBLICATIONS

"International Search Report and Written Opinion Issued in PCT Application No. PCT/US19/039108", dated Nov. 11, 2019, 11 Pages. (MS# 405064-WO-PCT).
(Continued)

*Primary Examiner* — Johnny B Aguiar
(74) *Attorney, Agent, or Firm* — Rainier Patents, P.S.

(57) ABSTRACT

Described herein is a system and method for startup and/or recovery for stream processing. During a startup phase: start anchor request(s), each identifying a particular time, are accumulated until request(s) are pending from downstream nodes. A minimum time of the accumulated start anchor request(s) is determined. If the processing system is an input node, an anchor associated with the determined minimum time is generated. Otherwise, a start anchor request is provided to an upstream node identifying the determined minimum time. Once the anchor associated with the determined minimum time is received (or generated), the anchor is provided in response to a polled start anchor request for the determined minimum time from a downstream node. Asynchronous requests for batches of data bounded by two specific anchors are performed in accordance with information stored in an ordered collection of anchors during a recovery phase.

18 Claims, 4 Drawing Sheets

(51) Int. Cl.
    *G06F 16/2455*     (2019.01)
    *G06F 9/4401*     (2018.01)

(58) Field of Classification Search
    USPC .......................................... 709/217, 219, 231
    See application file for complete search history.

(56) References Cited

U.S. PATENT DOCUMENTS

| | | | | |
|---|---|---|---|---|
| 2012/0282951 | A1* | 11/2012 | Nguyen | G06F 16/748 |
| | | | | 455/457 |
| 2016/0359940 | A1* | 12/2016 | Chen | H04L 65/4069 |
| 2018/0124141 | A1* | 5/2018 | Lewis | H04N 21/2187 |
| 2019/0098363 | A1* | 3/2019 | Hertzfeld | H04N 21/2747 |

OTHER PUBLICATIONS

Chen, Zhong, "Spark Streaming and Azure Stream Analytics", retrieved from "https://blogs.msdn.microsoft.com/streamanalytics/2016/06/16/spark-streaming-and-azure-stream-analytics/" on Sep. 27, 2018, Jun. 16, 2016, 6 pages.

U.S. Appl. No. 15/977,916, filed May 11, 2018, Specification and Drawings, 41 pages.

\* cited by examiner

ENHANCED ANCHOR PROTOCOL FOR EVENT STREAM PROCESSING

BACKGROUND

Stream processing allows multiple data streams from multiple sources to be processed in real-time. "Streaming" or stream processing refers to receiving streams of data, processing the data by multiple processors and streaming the processed data back out as a single flow.

SUMMARY

Described herein is a system for stream processing using anchors, comprising: a processing system comprising a processor and a memory having computer-executable instructions stored thereupon which, when executed by the processor, cause the processing system to: during a startup phase: at the processing system, accumulate one or more start anchor requests until a request are pending from downstream nodes coupled to the processing system, wherein each start anchor request identifies a particular time; determine a minimum time of the one or more accumulated start anchor requests; if the processing system is an input node, generate an anchor associated with the determined minimum time; if the processing system is not an input node: provide a start anchor request to an upstream node identifying the determined minimum time; receive the anchor associated with the determined minimum time; and, provide the anchor in response to a polled start anchor request for the determined minimum time from a downstream node.

In some embodiments, the computer-executable instructions are performed repeatedly until there are no more pending start anchor requests and a data request has been received from the downstream nodes coupled to the processing system which is indicative of completion of the startup phase. In some embodiments, after completion of the startup phase, asynchronous requests for batches of data bounded by two specific anchors are performed in accordance with information stored in an ordered collection of anchors until requests for data corresponding to the ordered collection of anchors has been completed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
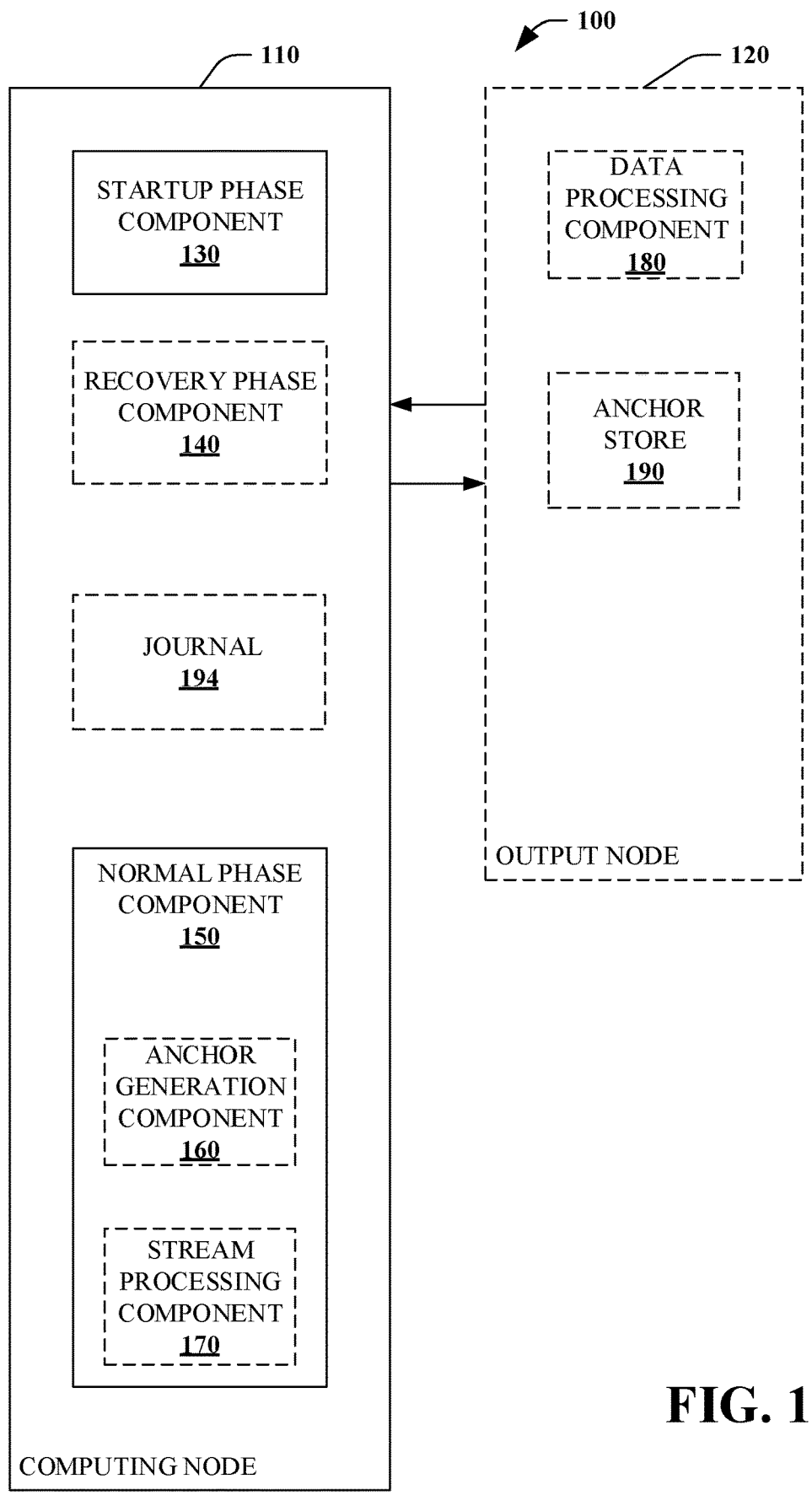
FIG. 1 is a functional block diagram that illustrates a system for stream processing using anchors.

Various technologies pertaining to startup and/or recovery of stream processing using anchors are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding startup and/or recovery for stream processing using anchors. What follows are one or more exemplary systems and methods.

Aspects of the subject disclosure pertain to the technical problem of startup and/or recovery for stream processing using anchors. The technical features associated with addressing this problem involve during a startup phase, accumulating start anchor request(s) until request(s) are pending from downstream node(s) coupled to the processing system, with each start anchor request identifies a particular time. A minimum time of the accumulated start anchor request(s) is determined. If the processing system is an input node, an anchor associated with the determined minimum time is generated. If the processing system is not an input node, a start anchor request is provided to an upstream node identifying the determined minimum time, and, the anchor associated with the determined minimum time is received. The anchor is provided in response to a polled start anchor request for the determined minimum time from a downstream node. The startup phase acts can be performed repeatedly until there are no more pending start anchor requests and a data request has been received from the downstream nodes coupled to the processing system which is indicative of completion of the startup phase. After completion of any startup phase, asynchronous requests for batches of data bounded by two specific anchors in accordance with information stored in an ordered collection of anchors are performed until requests for data corresponding to the ordered collection of anchors has been completed. Accordingly, aspects of these technical features exhibit technical effects of more efficiently and effectively starting up and/or recovering computing nodes of a stream processing system, for example, reducing consumption of network bandwidth and/or computing node processing resource(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

In some embodiments, the technologies disclosed herein are used in conjunction with pull-based stream processing employing anchor-based technology that facilitates once and only once processing by output node(s). An "anchor" is generated by an input node (e.g., along with data of an output stream) and describes a point in the output stream of the input node, so that other unit(s) of data in the output stream are either before or after any given anchor. For purposes of discussion, data "flows" downstream from an input node through any intermediate computing node(s) to an output node. A request for data is sent upstream from an output node through any intermediate computing node(s) to an input node. The use of anchors in streaming processing is more fully set forth in co-pending U.S. patent application Ser. No. 14/732,416 filed Dec. 8, 2016, entitled "Using Anchors for Reliable Stream Processing" by Zhong Chen, et al. which is incorporated herein by reference in its entirety.

During normal operation, down-stream nodes receive an anchor along with a batch of data. The anchor, generated by the input node that generated the batch of data, is a pointer in the output stream reflecting the last portion of data included in the batch of data. Once a downstream node (e.g., output node) has received and processed the batch of data, the downstream node can request another batch of data beginning with the anchor of batch of data last received/processed (e.g., indicative of the downstream node having processed data up to the anchor).

Described herein are system and method for startup and/or recovery for stream processing using anchors. Each processing node (e.g., input node(s), computing node(s), and/or output node(s)) can determine a current phase (e.g., startup, recovery, normal) based upon pending request(s) received from downstream node(s), if any.

During a startup phase, at a particular computing node, start anchor request(s) are accumulated until start anchor requests are pending from all downstream nodes coupled to the particular computing node (e.g., all downstream node(s) directly connected to the particular computing node). Each start anchor request includes an associated start time. Thereafter, a minimum time is determined for the accumulated, pending start anchor requests at the particular computing node. If needed for processing purposes on the particular computing node, the particular computing node can further modify the determined minimum time (e.g., based on a time window to facilitate processing by the particular computing node).

If the particular computing node is an input node, an anchor for the determined minimum time is generated. If the particular computing node is not an input node, a start anchor request is provided by the particular computing node to a next upstream computing node. In response, the particular computing node receives an anchor for the determined minimum time.

Having generated the anchor or received the anchor for the determined minimum time, the particular computing node provides the anchor to a downstream node in response to a polled start anchor request for the determined minimum time. In some embodiments, the particular node can repeat this process until there are no more pending start anchor requests. In some embodiments, the computing node can store the anchor and associated information in an ordered collection of anchor(s) (e.g., journal) for use during a recovery phase.

During the recovery phase, start anchor request(s), if any, have been fulfilled. A particular computing node can perform asynchronous request(s) for a batch of data bounded by two specific anchors of the ordered collection of anchor(s) (e.g., journal) received until request(s) for data in the ordered collection of anchor(s) received has been completed (e.g., using GetBatchUpto request(s), as discussed below).

In some embodiments, the ordered collection of anchor(s) (e.g., journal) is append only such that no entry(ies) (e.g., anchor(s)) can be added between two entries of the journal. During recovery phase, the journaled anchors allow for batches to be generated as the batches were generated previously, for example, before a particular node entered the recovery phase, up to the point where recovery phase has been completed and new batch(es) data are generated.

In some embodiments, anchors are generated in a strictly growing order, for each node. Accordingly, a new anchor generated by a particular node is greater than (e.g., represents a later point in a stream) any anchor previously generated by the particular input node. This can allow for the system to store anchors in the journal and replay the anchor in the order of appearance in the journal during recovery. In this manner, each node (e.g., input node, computing node, and/or output node) can recover independently of other node(s) without creating a cascading failure in the upstream node(s).

Referring to FIG. 1, a system for stream processing using anchors 100 is illustrated. In some embodiments, the system 100 can be used for startup and/or recovery of stream processing. The system 100 includes a computing node 110 and an output node 120. For purposes of explanation and not limitation, the system 100 will be described with one computing node 110 coupled to one output node 120. However, in some embodiments, the system 100 can include a plurality of computing nodes 110 with each coupled to one or more output nodes 120. In some embodiments, a particular output node 120 can be coupled to a plurality of computing nodes 110.

The computing node 110 and the output node 120 utilize an anchor which describes a specific point in an output stream, so that other units of data in the output stream are either before or after any particular anchor. An anchor is generated by a specific type of computing node 110 known as an input node. An anchor is a pointer in the output stream produced by the input node and reflects the last portion of data included in a batch of data (e.g., stream) accompanying the anchor. In some embodiments, an anchor can be a list of anchors. In some embodiments, an anchor can be a list of a list of anchors to any level of nesting.

In some embodiments, non-input nodes (e.g., computing nodes 110 other than input nodes and output nodes 120) do not need to understand anchors or how the anchors were generated by input nodes. The non-input nodes are responsible for being able to determine comparability of anchors. That is, whether a particular anchor indicates an event or point in the output stream occurring before another anchor, whether the particular anchor is equal to another anchor, or whether the particular anchor indicates an event or point in the output stream occurring after another anchor.

Downstream nodes can use the anchors of the upstream nodes to pull data. If an upstream node is unavailable (e.g., the up-stream node fails, etc.), the anchor supplied by the down-stream node after the restart will tell the upstream node precisely which data the downstream node has not yet processed. Similarly, if the downstream node is unavailable, the downstream node only needs to read its own state upon recovery, and resume pulling data from the upstream node using its last-used anchor.

The computing node 110 includes a startup phase component 130, a recovery phase component 140 and a normal phase component 150. During normal operation, the normal phase component 150 of a non-input computing node 110 can forward get batch requests for particular anchors to upstream processor(s), receive anchored batches and provide the received anchored batches to requesting nodes.

For a computing node 110 that is an input node, the normal phase component 150 can further include an anchor generation component 160 and a stream processing component 170. The stream processing component 160 processes data received from data stream(s) (e.g., of data source(s) (not shown)) to produce an output stream. In some embodiments, data can be real-time data received in real-time or recorded real-time data. In some embodiments, each unit of data in the data stream(s) can be associated with a time. In some embodiments, the time associated with the data can be a time at which the data was generated. In some embodiments, the time associated with the data can be a time at which the data was received. In some embodiments, the time associated with the data can be a time at which the data was sent. The anchor generation component 160 can generate an anchor that describes a point in the output stream of the input node such that other unit(s) of data (e.g., batches) in the output stream are either before or after any given anchor.

The output node 120 includes a data processing component 180 and an anchor store 190. The output node 120 receives anchor(s) and data stream(s), processes the data stream(s) via the data processing component 180. The output node 120 further stores an anchor associated (e.g., received) with a most recently received data stream in the anchor store 190 and store them. Stream processing can be based on time where time represents a logically-meaningful time value associated with a unit of data such as but not limited to an event. Time can be used to initiate processing to return requested results. For example, when the data stream comprises a stream of events, an anchor can be used to partition the data stream into two portions: events that came before the anchor, and events that came after the anchor.

During normal operation (e.g., normal phase), output nodes 120 can store a current anchor (the last anchor received) in the anchor store 190 so that when a request to continue is received, the output node 120 can use the current anchor into the output stream (e.g., stored in the anchor stored 190) to access the unsent results from the output data streams, rather than having some data resent. This enables the once and only once aspect of the use of anchors within streams. The output node 120 thus controls what data is sent to it using anchors.

In some embodiments, anchors can relate to physical aspects of an input data stream such as but not limited to an offset into a file. An offset into a file can indicate how many bytes of the file have already been read and/or processed. While not logically meaningful information, this information can enable an input node to easily resume stream processing from the exact place at which it left off.

Anchors can be used to read data from data streams based on a time (e.g., user-specified time). The time can be used to initiate operations and/or to generate the results requested (e.g., by the user). One way to enumerate units of data such as but not limited to events in a data stream given an anchor (startAnchor), is by using an instruction such as: GetBatch (Anchor startAnchor, out Batch data, out Anchor newAnchor). Execution of such an instruction can return a batch of events (Batch data) starting from the specified starting anchor (startAnchor). The operation may also return a new anchor (newAnchor) which can allow enumeration of results (Batch data) to continue. When this instruction is executed, all events E in the data stream can be returned such that startAnchor<E<newAnchor. If an event E is not in the data stream but E>startAnchor, then E>newAnchor.

Startup Phase

During the startup phase, the startup phase component 130 of the computing node 110 accumulates start anchor request(s) received from downstream node(s) until start anchor requests are pending from all downstream nodes coupled to the particular computing node 110 (e.g., from all downstream node(s) directly connected to the computing node 110). Each start anchor request includes an associated start time. Thereafter, a minimum time is determined for the accumulated, pending start anchor requests at the computing node 110. In some embodiments, if needed for windowing purposes on the computing node 110, the startup phase component 130 can further modify the determined minimum time in accordance with time needed for windowing at the computing node 110.

If the computing node 110 is an input node, an anchor for the determined minimum time is generated. If the computing node 110 is not an input node, a start anchor request is provided by the computing node 110 to a next upstream computing node. In response, the computing node 110 asynchronously receives an anchor for the determined minimum time.

Having generated the anchor or received the anchor for the determined minimum time, the computing node 110 provides the anchor to a downstream node in response to a polled start anchor request for the determined minimum time. In some embodiments, the computing node 110 can repeat this startup phase process until there are no more pending start anchor requests and none are expected (e.g., get batch request(s) have been received from all nodes immediately downstream).

In some embodiments, startup phase component 130 can store information regarding requested anchors including start time (e.g., provided in start anchor request), the anchor corresponding to the particular start time and node(s) requesting the particular anchor in an ordered collection (e.g., chronologically organized table) stored in a journal 194. In some embodiments, the journal 194 can be utilized by the recovery phase component 140.

Recovery Phase

Before commencing the recovery phase, start anchor request(s), if any, have been fulfilled. A non-input computing node 110 can perform asynchronous request(s) for batch(es) of data bounded by two specific anchors of an ordered sequence of anchor(s) (e.g., stored in the journal 194) received until request(s) for data in the ordered sequence of anchor(s) received has been completed (e.g., using GetBatchUpto request(s)). For example, using information organized in the journal 194, the recovery phase component 140 can determine that a first batch of data corresponds to events/time between a first anchor and a second anchor. The computing node 110 can generate a request to an upstream node for data beginning with the first anchor and ending with the second anchor (GetBatchUpto (first anchor, second anchor). The upstream node can return data in response to the request with a new anchor, with the new anchor less than or equal to the second anchor. The computing node 110 can provide the data received from the upstream node and the new anchor in response to a polled request for data beginning with the first anchor.

The computing node 110 can perform similar requests to the upstream node utilizing the journal 194 to sequentially retrieve relevant batches of data until exhausting entries in the journal which is indicative of the recovery phase being completed.

Figure 2:
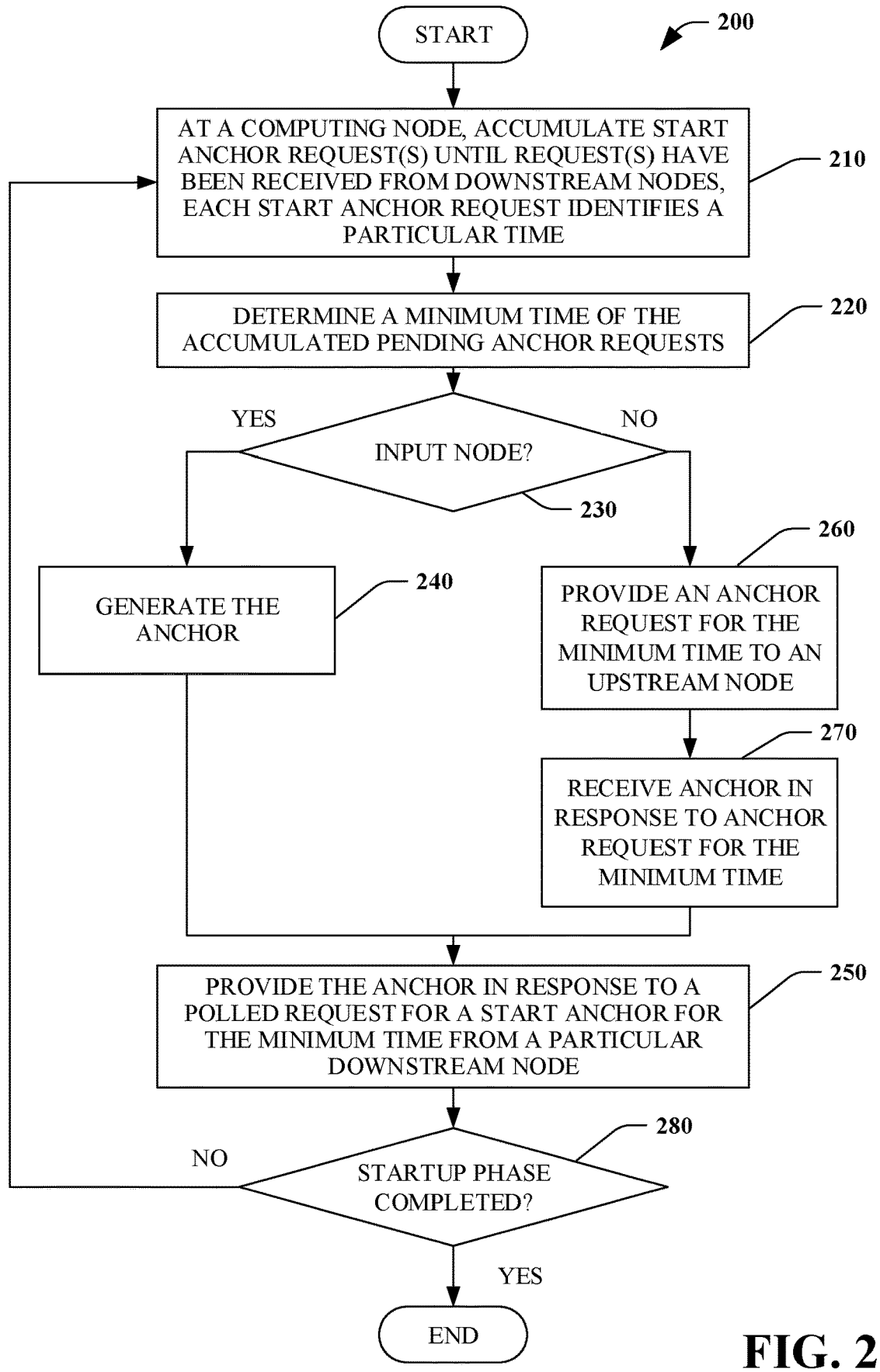
FIG. 2 is a flow chart of a method of stream processing using anchors.
Figure 3:
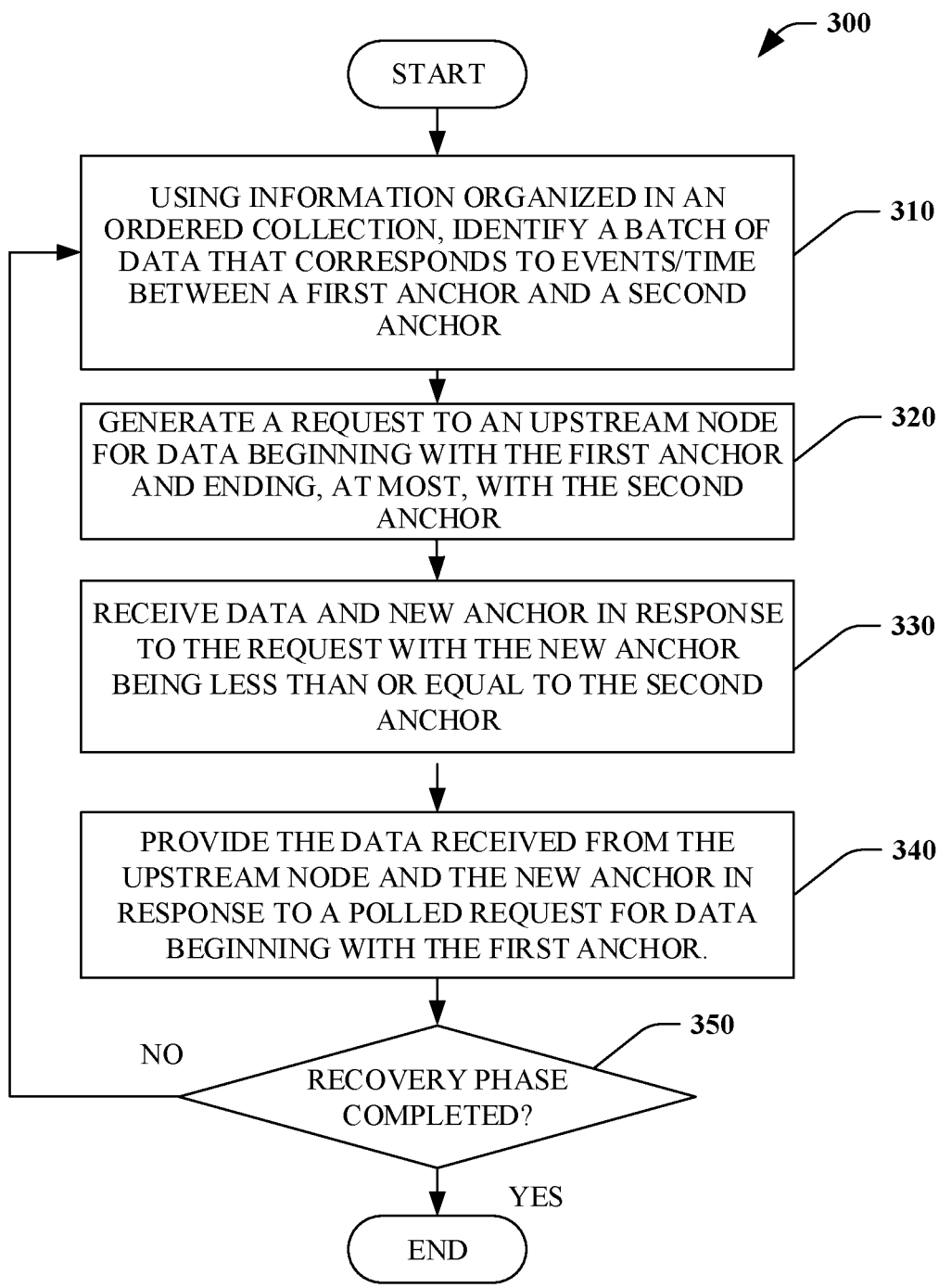
FIG. 3 is a flow chart of another method of stream processing using anchors.

FIGS. 2 and 3 illustrate exemplary methodologies relating to a startup phase and a recovery phase for stream processing using anchors. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 2, a method of stream processing using anchors 200 is illustrated. In some embodiments, the method 200 is performed during a startup phase by the system 100.

At 210, at a computing node, start anchor request(s) are accumulated until a request has been received from connected downstream nodes (e.g., all downstream node(s) connected to the computing node). Each start anchor request identifies a particular time. At 220, a minimum time of the accumulated anchor request(s) is determined.

At 230, a determination is made as to whether or not the computing node is an input node. If the determination at 230 is YES, at 240, an anchor associated with the determined minimum time is generated, and, processing continues at 250. If the determination at 230 is NO, at 260, a start anchor request is provided to an upstream node identifying the determined minimum time. At 270, the anchor associated with the determined minimum time is received (e.g., from the upstream node).

At 250, the anchor is provided in response to a polled start anchor request for the determined minimum time from a particular downstream node. At 280, a determination is made as to whether or not the startup phase is completed. If the determination at 280 is NO, processing continues at 210. If the determination at 280 is YES, no further processing occurs.

Turning to FIG. 3, a method of stream processing using anchors 300 is illustrated. In some embodiments, the method 300 is performed during a recovery phase by the system 100.

At 310, using information organized in an ordered collection, a batch of data is identified that corresponds to events/time between a first anchor and a second anchor. At 320, a request for data beginning with the first anchor and, at most, ending with the second anchor, is generated and provided to an upstream node.

At 330, data and a new anchor is received (e.g., from the upstream node) in response to the request, the new anchor is less than or equal to the second anchor. At 340, the data and new anchor received from the upstream node is provide in response to a polled request for data beginning with the first anchor. At 350, a determination is made as to whether or not the recovery phase is completed. If the determination at 350 is NO, processing continues at 310. If the determination at 350 is YES, no further processing occurs.

Described herein is a system for stream processing using anchors, comprising: a processing system comprising a processor and a memory having computer-executable instructions stored thereupon which, when executed by the processor, cause the processing system to: during a startup phase: at the processing system, accumulate one or more start anchor requests until requests are pending from one or more downstream nodes coupled to the processing system, wherein each start anchor request identifies a particular time; determine a minimum time of the one or more accumulated start anchor requests; if the processing system is an input node, generate an anchor associated with the determined minimum time; if the processing system is not an input node: provide a start anchor request to an upstream node identifying the determined minimum time; receive the anchor associated with the determined minimum time; and provide the anchor in response to a polled start anchor request for the determined minimum time from a downstream node.

The system can further include wherein the computer-executable instructions are performed repeatedly until there are no more pending start anchor requests and a data request has been received from the downstream nodes coupled to the processing system which is indicative of completion of the startup phase. The system can further include wherein after completion of the startup phase, performing asynchronous requests for batches of data bounded by two specific anchors in accordance with information stored in an ordered collection of anchors until requests for data corresponding to the ordered collection of anchors has been completed.

The system can further include wherein data corresponding to one or more of the batches of data is persistently stored at the processing system and provided in response to a request for a particular batch of data and a particular anchor. The system can further include wherein the requests for data are generated by a particular node in a recovery phase otherwise independent of the processing system. The system can further include wherein after completion of the startup phase, in response to a request for a particular batch of data and a particular anchor, provide the particular batch of data and another anchor from data persistently stored at the processing system.

The system can further include wherein the processing system modifies the determined minimum time in accordance with a time window associated with processing performed by the processing system. The system can further include wherein the processing system is not an input node, and, the processing system is configured to determine whether another anchor described a point in an output stream before, after, or equal to the anchor.

Described herein is a method of stream processing using anchors, comprising: at a computing node, accumulating start anchor requests until a request has been received from connected downstream nodes, wherein each start anchor request identifies a particular time; determining a minimum time of the accumulated anchor requests; if the computing node is an input node, generating an anchor associated with the determined minimum time; if the processing system is not an input node: providing a start anchor request to an upstream node identifying the determined minimum time; receiving the anchor associated with the determined minimum time; and providing the anchor in response to a polled start anchor request for the determined minimum time from a particular downstream node.

The method can further include performed repeatedly until there are no more pending start anchor requests and a data request has been received from the downstream nodes connected to the computing node which is indicative of completion of the startup phase. The method can further include after completion of the startup phase, performing asynchronous requests for batches of data bounded by two specific anchors in accordance with information stored in an ordered collection of anchors until requests for data corresponding to the ordered collection of anchors has been completed.

The method can further include wherein data corresponding to one or more of the batches of data is persistently stored at the processing system and provided in response to a request for a particular batch of data and a particular anchor. The method can further include after completion of the startup phase, in response to a request for a particular batch of data and a particular anchor, providing the particular batch of data and another anchor from data persistently stored at the computing node. The method can further include modifying the determined minimum time in accordance with a time window associated with processing performed by the computing node.

The method can further include wherein anchors are generated for a particular node in a strictly growing order. The method can further include wherein the computing node is not an input node, and, the method further comprising determining whether another anchor describes a point in an output stream before, after, or equal to the anchor.

Described herein is a computer storage media storing computer-readable instructions that when executed cause a computing device to: during a startup phase: accumulate one or more start anchor requests until a request are pending from downstream nodes coupled to the computing device, wherein each start anchor request identifies a particular time; determine a minimum time of the one or more accumulated start anchor requests; if the computing device is an input node, generate an anchor associated with the determined minimum time; if the computing device is not an input node: provide a start anchor request to an upstream node identifying the determined minimum time; receive the anchor associated with the determined minimum time; and provide the anchor in response to a polled start anchor request for the determined minimum time from a downstream node.

The computer storage media can store further computer-readable instructions that when executed cause the computing device to: repeatedly perform the instructions until there are no more pending start anchor requests and a data request has been received from the downstream nodes coupled to the computing device which is indicative of completion of the startup phase.

The computer storage media can store further computer-readable instructions that when executed cause the computing device to: after completion of the startup phase, perform asynchronous requests for batches of data bounded by two specific anchors in accordance with information stored in an ordered collection of anchors until requests for data corresponding to the ordered collection of anchors has been completed. The computer storage media can store further computer-readable instructions that when executed cause the computing device to: modify the determined minimum time in accordance with a time window associated with processing performed by the computing device.

Figure 4:
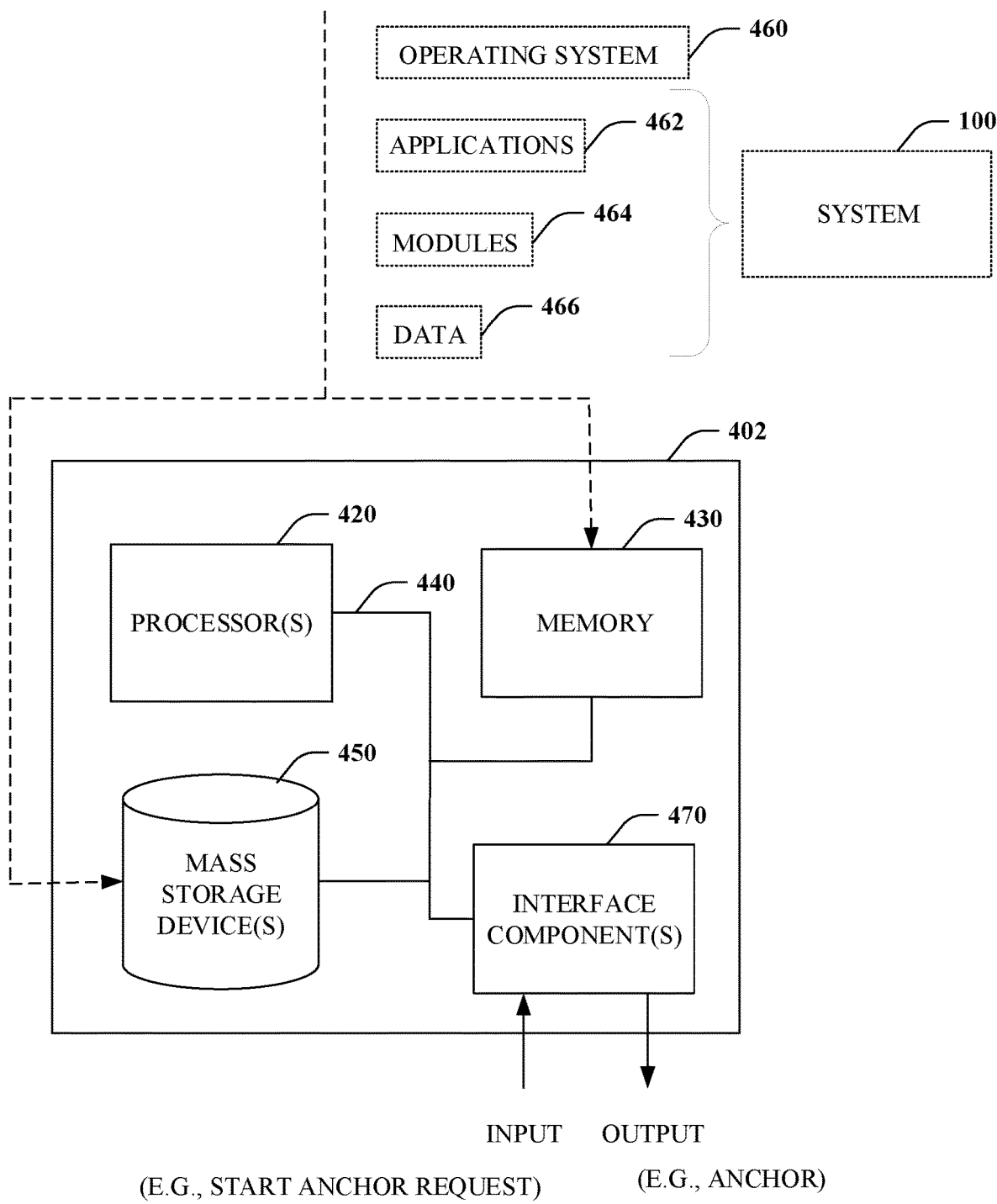
FIG. 4 is a functional block diagram that illustrates an exemplary computing system.

With reference to FIG. 4, illustrated is an example general-purpose processing system, computer or computing device 402 (e.g., mobile phone, desktop, laptop, tablet, watch, server, hand-held, programmable consumer or industrial electronics, set-top box, game system, compute node, etc.). For instance, the computing device 402 may be used in a system for stream processing using anchors 100 (e.g., computing node 110).

The computer 402 includes one or more processor(s) 420, memory 430, system bus 440, mass storage device(s) 450, and one or more interface components 470. The system bus 440 communicatively couples at least the above system constituents. However, it is to be appreciated that in its simplest form the computer 402 can include one or more processors 420 coupled to memory 430 that execute various computer executable actions, instructions, and or components stored in memory 430. The instructions may be, for instance, instructions for implementing functionality described as being carried out by one or more components discussed above or instructions for implementing one or more of the methods described above.

The processor(s) 420 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 420 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 420 can be a graphics processor.

The computer 402 can include or otherwise interact with a variety of computer-readable media to facilitate control of the computer 402 to implement one or more aspects of the claimed subject matter. The computer-readable media can be any available media that can be accessed by the computer 402 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 402. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 430 and mass storage device(s) 450 are examples of computer-readable storage media. Depending on the exact configuration and type of computing device, memory 430 may be volatile (e.g., RAM), non-volatile (e.g., ROM, flash memory, etc.) or some combination of the two. By way of example, the basic input/output system (BIOS), including basic routines to transfer information between elements within the computer 402, such as during start-up, can be stored in nonvolatile memory, while volatile memory can act as external cache memory to facilitate processing by the processor(s) 420, among other things.

Mass storage device(s) 450 includes removable/non-removable, volatile/non-volatile computer storage media for storage of large amounts of data relative to the memory 430. For example, mass storage device(s) 450 includes, but is not limited to, one or more devices such as a magnetic or optical disk drive, floppy disk drive, flash memory, solid-state drive, or memory stick.

Memory 430 and mass storage device(s) 450 can include, or have stored therein, operating system 460, one or more applications 462, one or more program modules 464, and data 466. The operating system 460 acts to control and allocate resources of the computer 402. Applications 462 include one or both of system and application software and can exploit management of resources by the operating system 460 through program modules 464 and data 466 stored in memory 430 and/or mass storage device (s) 450 to perform one or more actions. Accordingly, applications 462 can turn a general-purpose computer 402 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 462, and include one or more modules 464 and data 466 stored in memory and/or mass storage device (s) 450 whose functionality can be realized when executed by one or more processor(s) 420.

In accordance with one particular embodiment, the processor(s) 420 can correspond to a system on a chip (SOC) or like architecture including, or in other words integrating, both hardware and software on a single integrated circuit substrate. Here, the processor(s) 420 can include one or more processors as well as memory at least similar to processor(s) 420 and memory 430, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 402 also includes one or more interface components 470 that are communicatively coupled to the system bus 440 and facilitate interaction with the computer 402. By way of example, the interface component 470 can be a port (e.g., serial, parallel, PCMCIA, USB, FireWire, etc.) or an interface card (e.g., sound, video, etc.) or the like. In one example implementation, the interface component 470 can be embodied as a user input/output interface to enable a user to enter commands and information into the computer 402, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 470 can be embodied as an output peripheral interface to supply output to displays (e.g., LCD, LED, plasma, etc.), speakers, printers, and/or other computers, among other things. Still further yet, the interface component 470 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
   a processing system comprising a processor and a memory having computer-executable instructions stored thereupon which, when executed by the processor, cause the processing system to function as an intermediate node by:
   during a startup phase:
      accumulating, at the intermediate node, a plurality of start anchor requests from a plurality of downstream nodes coupled to the intermediate node, wherein the plurality of start anchor requests identify particular times;
      determining a minimum time based at least on the particular times identified by the plurality of start anchor requests;
      providing another start anchor request to an upstream node, the another start anchor request identifying the determined minimum time; and
      continuing the startup phase until there are no more pending start anchor requests and a data request has been received from at least one of the plurality of downstream nodes, wherein the data request is indicative of completion of the startup phase,
      wherein the determined minimum time is usable by the upstream node or another upstream node to generate a corresponding anchor describing a point in a data stream for processing by the processing system.

2. The computing system of claim 1, wherein the computer-executable instructions cause the processing system to function as the intermediate node by:
   after completion of the startup phase, performing asynchronous requests for batches of data bounded by two specific anchors in accordance with information stored in an ordered collection of anchors until requests for data corresponding to the ordered collection of anchors have been completed.

3. The computing system of claim 2, wherein the computer-executable instructions cause the processing system to function as the intermediate node by:
   persistently storing data corresponding to one or more of the batches of data at the intermediate node; and
   providing a particular batch of data in response to receipt of a request for the particular batch of data and a particular anchor.

4. The computing system of claim 2, wherein the requests for data are generated by a particular node in a recovery phase otherwise independent of the intermediate node.

5. The computing system of claim 1, wherein the computer-executable instructions cause the processing system to function as the intermediate node by:
   after completion of the startup phase, in response to a request for a particular batch of data and a particular anchor, providing the particular batch of data and another anchor from data persistently stored at the intermediate node.

6. The computing system of claim 1, wherein the computer-executable instructions cause the processing system to function as the intermediate node by:
   modifying the determined minimum time in accordance with a time window associated with processing performed by the intermediate node.

7. The computing system of claim 1, wherein the computer-executable instructions cause the processing system to function as the intermediate node by:
   determining whether another anchor describes a point in an output stream before, after, or equal to the corresponding anchor.

8. A method, comprising:
   by an intermediate computing node during a startup phase:
   accumulating start anchor requests from connected downstream nodes, wherein the start anchor requests identify particular times;
   determining a minimum time based at least on the particular times identified by the start anchor requests; and
   providing another start anchor request to an upstream node, the another start anchor request identifying the determined minimum time,
   wherein the determined minimum time is usable by the upstream node or another upstream node to generate a corresponding anchor describing a point in a data stream for processing by the intermediate computing node, and
   wherein the method is performed repeatedly by the intermediate computing node until there are no more pending start anchor requests and a data request has been received from at least one of the connected downstream nodes, the data request being indicative of completion of the startup phase.

9. The method of claim 8, further comprising:
   by the intermediate computing node and after completion of the startup phase, performing asynchronous requests for batches of data bounded by two specific anchors in accordance with information stored in an ordered collection of anchors until requests for data corresponding to the ordered collection of anchors have been completed.

10. The method of claim 9, further comprising:
    persistently storing data corresponding to one or more of the batches of data at the intermediate computing node; and
    by the intermediate computing node, providing a particular batch of data in response to receipt of a request for the particular batch of data and a particular anchor.

11. The method of claim 8, further comprising:
    by the intermediate computing node and in response to receipt of a request for a particular batch of data and a particular anchor, providing the particular batch of data and another anchor from data persistently stored at the intermediate computing node.

12. The method of claim 8, further comprising:
    modifying the determined minimum time in accordance with a time window associated with processing performed by the intermediate computing node.

13. The method of claim 8, wherein anchors are generated for a particular node in a strictly growing order.

14. The method of claim 8, further comprising:
    by the intermediate computing node, determining whether another anchor describes a point in an output stream before, after, or equal to the corresponding anchor.

15. A computer storage media storing computer-readable instructions that, when executed, cause a computing device to function as an intermediate computing node by:
    during a startup phase:
    accumulating start anchor requests from downstream computing nodes coupled to the intermediate computing node, wherein the start anchor requests identify particular times;
    determining a minimum time based at least on the particular times identified by the start anchor requests;
    providing another start anchor request to an upstream node, the another start anchor request identifying the determined minimum time; and
    continuing the startup phase until there are no more pending start anchor requests and a data request has been received from at least one of the downstream computing nodes, wherein the data request is indicative of completion of the startup phase,
    wherein the determined minimum time is usable by the upstream node or another upstream node to generate a corresponding anchor describing a point in a data stream for processing by the intermediate computing node.

16. The computer storage media of claim 15, storing further computer-readable instructions that, when executed, cause the computing device to function as the intermediate computing node by:
    receiving the corresponding anchor, the corresponding anchor being associated with the determined minimum time; and
    providing the corresponding anchor in response to a polled start anchor request for the determined minimum time from a particular downstream node.

17. The computer storage media of claim 16, storing further computer-readable instructions that, when executed, cause the computing device to function as the intermediate computing node by:
    performing asynchronous requests for batches of data bounded by two specific anchors in accordance with information stored in an ordered collection of anchors until requests for data corresponding to the ordered collection of anchors have been completed.

18. The computer storage media of claim 15, storing further computer-readable instructions that, when executed, cause the computing device to function as the intermediate computing node by:

modifying the determined minimum time in accordance with a time window associated with processing performed by the intermediate computing node.

\* \* \* \* \*